United States Patent
Wasley et al.

[15] 3,706,594
[45] Dec. 19, 1972

[54] FIBROUS SUBSTRATE TREATED WITH COPOLYMERS OF FLUOROALKYL ETHERS AND MALEIC ANHYDRIDE

[72] Inventors: William L. Wasley, Berkeley; Allen G. Pittman, El Cerrito, both of Calif.

[73] Assignee: The United States of America as represented by the Secretary of Agriculture

[22] Filed: Feb. 22, 1971

[21] Appl. No.: 117,777

[52] U.S. Cl. ...117/139.5 A, 117/124 E, 117/126 AB, 117/138.8 F, 117/138.8 D, 117/138.8 N, 117/138.8 UA, 117/141, 117/142, 117/143 A, 117/145, 117/155 UA, 117/161 UZ
[51] Int. Cl. .............................................D06m 15/16
[58] Field of Search..117/139.5 A, 138.8 N, 138.8 F, 117/138.8 UA, 141, 142, 143 A, 145, 121, 161 UZ, 138.8 UF; 260/78.5 R, 78.5 CL

[56] References Cited

UNITED STATES PATENTS

| | | | |
|---|---|---|---|
| 3,437,692 | 4/1969 | Pittman et al. | 117/121 UX |
| 3,522,084 | 7/1970 | Pittman et al. | 117/143 A |
| 3,541,159 | 11/1970 | Pittman et al. | 260/614 F |
| 3,361,685 | 1/1968 | Pittman et al. | 117/139.5 A |
| 3,382,222 | 5/1968 | Pittman et al. | 260/91.1 R |
| 3,384,628 | 5/1968 | Pittman et al. | 117/121 UX |
| 3,479,214 | 11/1969 | Pittman et al. | 117/121 X |

*Primary Examiner*—William D. Martin
*Assistant Examiner*—Theodore G. Davis
*Attorney*—R. Hoffman, W. Bier and W. Takacs

[57] ABSTRACT

Fluoroalkyl allyl (or methallyl) ethers are copolymerized with maleic anhydride. The copolymer products are useful for many purposes, including application to fibrous materials to provide both soil repellency and soil releasability.

20 Claims, No Drawings

FIBROUS SUBSTRATE TREATED WITH COPOLYMERS OF FLUOROALKYL ETHERS AND MALEIC ANHYDRIDE

A non-exclusive, irrevocable, royalty-free license in the invention herein described, throughout the world for all purposes of the United States Government, with the power to grant sublicenses for such purposes, is hereby granted to The Government of the United States of America.

This invention relates to and has among its objects the provision of novel polymers which are particularly useful for imparting soil-repellent and soil-release properties to fibrous materials. The objects of the invention also include procedures for treating fibrous materials with the polymers, and the treated materials as new articles of manufacture. Further objects of the invention will be evident from the following description wherein parts and percentages are by weight unless otherwise specified.

It is not generally realized that maintaining textiles in a clean state involves two different properties of the textile. One is soil repellency, that is, the ability of the textile to resist staining when it is contacted with gravy, butter, grease, or other oily substances. The other is soil releasability. Assuming that a textile has become stained, this property concerns the ease or difficulty of washing out the stains. The soil repellency and soil releasability characteristics of a given textile depend of the kind of fiber from which it is made and the kind of finishing agent which has been applied to it. Natural fibers such as cotton and wool exhibit little soil repellency, but on the other hand when they do become soiled they are readily cleaned, that is, they exhibit a high level of soil releasability. Some of the synthetics, notably polyesters, not only exhibit a low level of soil repellency but also a low level of soil releasability. Thus the modern trend toward fabricating textiles from blends of cotton or wool with polyesters has aggravated the situation because such blends are easily soiled and the absorbed soil is difficult to wash out. The application of resins for providing durable press properties still further aggravates the soil release situation. Almost everyone has encountered a situation where a so-called wash-and-wear garment of resin-treated cotton/polyester or wool/polyester blended material has become soiled by contact with an oily substance, and it is found that it takes repeated washings to remove the stains. In efforts to circumvent these problems, fluorocarbon polymers have been applied to the textiles. Because of the oleophobic properties of most fluorocarbons, such treatments do enhance the soil repellence of the fabric. However, they tend to make the soil release properties even worse because the aqueous washing medium cannot properly wet the fabric, hence cannot remove stains. Another remedy has been to apply hydrophilic materials, generally polymeric, to the textiles. These generally make it easier to wash out stains, but they do not enhance the ability of the textile to resist staining when contacted with oily substances.

A particular object of the invention is to provide the means for alleviating the problems outlined above. The invention provides polymers which confer oil-repellence on fabrics so that they strongly resist staining, e.g., by oily foods or the like. Concomitantly, these polymers confer soil-release properties on the fabric to which they are applied. This means that if the fabric does become stained, the stains can be readily washed out. Another advantage is that these polymers confer anti-static properties on the fabric to which they are applied.

The polymers having this desirable combination of properties are copolymerization products of at least two different monomers, one imparting oleophobic properties, the other hydrophilic properties. More specifically, the oleophobic monomer is an ether of the structure

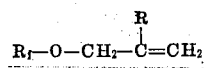

wherein R represents H or $CH_3$, and $R_f$ represents a fluoroalkyl radical containing a terminal perfluoroalkyl group having three to 18 perfluorinated carbon atoms. This fluoroalkyl group can be of an open-chain (acyclic) configuration, straight or branched. Alternatively, it may be of a cyclic structure such as a perfluorocyclohexyl group, or it may be a combination of acyclic and cyclic structures. Generally, the acyclic structures are preferred. These monomers are known in the art and described in the literature.

Representative examples of such monomers are listed below by way of illustration and not limitation:

$CF_3-(CF_2)_2-O-CH_2-CH=CH_2$
$CF_3-(CF_2)_4-O-CH_2-CH=CH_2$
$CF_3-(CF_2)_5-O-CH_2-CH=CH_2$
$CF_3-(CF_2)_5-O-CH_2-C(CH_3)=CH_2$
$CF_3-(CF_2)_6-O-CH_2-C(CH_3)=CH_2$
$CF_3-(CF_2)_7-O-CH_2-C(CH_3)=CH_2$
$CF_3-(CF_2)_9-O-CH_2-C(CH_3)=CH_2$
$CF_3-(CF_2)_{11}-O-CH_2-C(CH_3)=CH_2$
$CF_3-(CF_2)_{13}-O-CH_2-C(CH_3)=CH_2$
$(CF_3)_2CF-O-CH_2-CH=CH_2$
$(CF_3)_3CF-O-CH_2-C(CH_3)=CH_2$

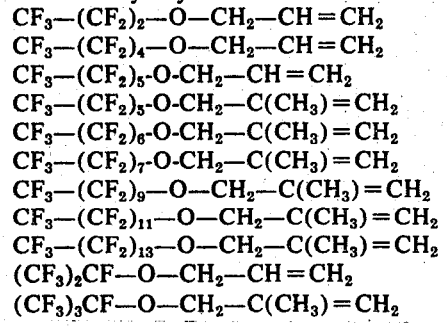

$CF_3-(CF_2)_2-CH_2-O-CH_2-C(CH_3)=CH_2$
$CH_3-(CF_2)_3-CH_2-O-CH_2-C(CH_3)=CH_2$
$CF_3-(CF_2)_{10}-CH_2-O-CH_2-C(CH_3)=CH_2$
$CF_3-(CF_2)_9-(CH_2)_2-O-CH_2-C(CH_3)=CH_2$
$CF_3-(CF_2)_7-(CH_2)_3-O-CH_2-C(CH_3)=CH_2$
$CF_3-(CF_2)_7-(CH_2)_6-O-CH_2-C(CH_3)=CH_2$
$CF_3-(CF_2)_7-(CH_2)_{12}-O-CH_2-C(CH_3)=CH_2$

It is generally preferred to use methallyl ethers—that is, the compounds wherein R is $CH_3$—since they yield copolymers of especially high molecular weight. With regard to $R_f$, a preferred embodiment thereof is a radical of the category

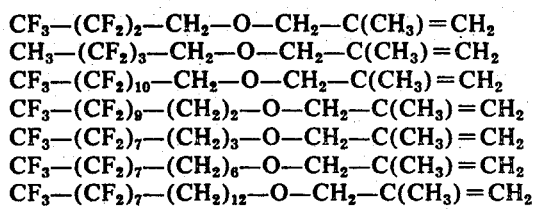

wherein $n$ is an integer from 0 to 7. Such radicals contain a fluorine group in alpha position, that is, on the secondary carbon (marked by an asterisk in the formula above) which is joined to the ether oxygen. The unique structure of these radicals provides the advantage that they confer a greater degree of oleophobicity for a given number of fluorinated carbon atoms that with other arrangements of fluorinated carbon atoms, for example, those in straight chains. In fact, our investigations have shown that 3 fluorinated carbon atoms in our arrangement provides a degree of oleophobicity equivalent to 6 or 7 fluorinated carbon atoms in a straight chain or other configuration which lacks the critical alpha-fluoro configuration. A particularly preferred member of this category is the heptafluoroisopropyl radical $(CF_3)_2CF-$. Allyl and methylallyl ethers containing this radical can be readily made from the relatively inexpensive starting material hexafluoroacetone, as disclosed in our U.S. Pat. Nos. 3,382,222, 3,437,692, 3,522,084, and 3,541,159.

The hydrophilic monomer in accordance with the invention is maleic anhydride

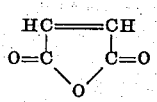

The copolymers resulting from the copolymerization of the aforesaid monomers contain recurring units of the structure

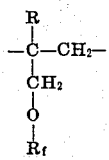

wherein R and $R_f$ have the meanings given above, and recurring units of structure

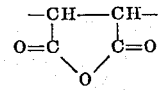

In general, the copolymers will contain the aforesaid units in a 1:1 mole ratio.

It is evident from the above that the copolymers of the invention have a carbon-to-carbon backbone, plus pendant $R_f$ groups which provide oleophobicity, and plus pendant anhydride groups which provide hydrophilic (soil-release) properties.

A special feature of the invention is that is provides polymers of high molecular weight even though one of the comonomers (the oleophobic monomer) has an allyl structure. Normally, allyl monomers polymerize with difficulty and give products of low molecular weight. See Liable, Chemical Reviews, Vol. 58, pages 807–843, especially pages 807, 808, and 811.

PREPARATION OF THE COPOLYMERS

The copolymers of the invention are prepared by conventional polymerization methods using bulk, solution, or emulsion techniques. The reactants may be copolymerized under the influence of heat, light, or a combination of heat and light. The use of polymerization catalysts is preferred and for this purpose one may use peroxides such as benzoyl peroxide, acetyl peroxide, lauroyl peroxide, di-tert-butyl peroxide, or an azo initiator such as $\alpha,\alpha'$-azo-diisobutyronitrile or $\alpha,\alpha'$-azobis-($\alpha,\gamma$-dimethyl-valeronitrile). Where the polymerization is conducted in solution, one may use fluorinated solvents, for example, benzotrifluoride, 1,3-bis-(trifluoromethyl)-benzene, trichlorotrifluoroethane, or the like. However, other (non-fluorinated) solvents such as benzene, toluene, xylene, etc. may be used. In carrying out the copolymerization in solution, temperatures of about 50°–100b$L$ C. are generally used. The copolymer products range from viscous liquids to semi-solid or even solid materials. They are generally soluble in solvents such as acetone, methyl-ethyl ketone, and in fluorinated solvents such as benzotrifluoride, 1,3-bis-(trifluoromethyl)-benzene, trichlorotrifluoroethane and the like.

In preparing the copolymers of the invention, the proportions of the monomers may be varied. In general, however, the monomers are used in approximately equimolar proportions.

The copolymers of the invention encompass those which are prepared by copolymerization of the oleophobic and hydrophilic monomers as above described plus one or more monomers which are different from both of the basic reactants. The additional monomer may be employed to modify the mechanical properties of the copolymer without materially affecting its ability to provide soil repellency and soil releasability. For such purpose one may use methyl, ethyl, butyl, or other alkyl acrylates or methacrylates, vinyl chloride, vinyl fluoride, ethylene, butadiene, etc. Monomers which may be used to increase the adherence of the copolymer to fibrous substrates include acryloyl or methacryloyl chloride, N-methylol acrylamide, allyl acrylate, etc. In the event an additional monomer is added to the copolymerization system, it is employed in a proportion up to about 1 mole per mole of the oleophobic monomer.

The copolymers of the invention are useful in many areas, for example, as adhesives and coatings, textile sizes, binders and thickeners, etc. The high molecular-weight copolymers are useful for preparing filaments, films, foils, and shaped articles of all kinds. The copolymers are particularly useful for the treatment of fibrous materials, such as textiles, in order to enhance their oil-, water-, and soil-repellency and concomitantly to make it easier to remove stains if they should become stained. Moreover, these improvements are attained without detriment to other properties of the fibrous substrate. For example, the treatment does not impair the color, hand, or strength of the substrate. Another point is that the improvements are durable; they are retained despite laundering and dry cleaning of the treated materials.

In applying the copolymer to a substrate, a typical procedure involves dissolving the copolymer in an inert volatile solvent, e.g., benzotrifluoride, 1,3-bis-trifluoromethyl benzene, trichlorotrifluoroethane, tetrahydrofuran, or acetone. The resulting solution is applied to the substrate by immersion, brushing, spraying, flooding, or the like. With textiles, conventional dip-and-pad techniques are preferred. By varying the concentration of copolymer in solution, the amount of copolymer deposited on the material may be varied. Typically, the amount of copolymer may be from 0.1 to 20 percent, based on the weight of fibrous material but it is obvious that higher or lower proportions can be used if desired. Usually, in treating textiles such as fabrics, the amount of copolymer is limited to about 0.1 to 5 percent to attain the desired repellency and soil release property without interference with the hand of the textile. In an alternative procedure, the copolymer is applied to the substrate, using water as the carrier for the copolymer. This is accomplished by forming an aqueous emulsion of the copolymer, using a conventional emulsifying agent to maintain the copolymer uniformly dispersed in the liquid. The emulsion is applied in any of the ways previously described and the amount of copolymer applied to the substrate is likewise as above.

After application of the copolymer, the treated substrate is subjected to a curing operation in order to bond the polymer to the fibers. As an example of such treatment, the fibrous material is heated in the range of about 50° to 100° C. for a period of 5 to 60 minutes. The carrier (from the copolymer solution or emulsion) may be evaporated in a separate step prior to curing or it may simply be evaporated during the curing operation.

In applying the copolymers of the invention to fibrous substrates, they may be accompanied by other substances, e.g., conventional finishing agents. Thus, a dispersion (i.e., solution, emulsion, or suspension) is made of an inert liquid carrier, the copolymer in accordance with the invention, and the additional substance which may be, for instance, a moth-proofing agent, fungicide, coloring material, optical bleach, size, etc. The dispersion is applied and the treated fibrous material cured as disclosed previously. The inert liquid carrier may be water or any of the solvents described above.

The invention may be utilized for improving the properties of all types of fibrous materials, for example, paper; cotton; linen; hemp; jute; ramie; sisal; cellulose acetate rayons; cellulose acetate-butyrate rayons; saponified acetate rayons; viscose rayons; cuprammonium rayons; ethyl cellulose; fibers prepared from amylose, algins, or pectins; wool; silk; animal hair; mohair; leather; fur; regenerated protein fibers prepared from casein, soybean, peanut proteins, zein, gluten, egg albumin, collagen, or keratins; nylon; polyurethane fibers; polyester fibers such as polyethylene terephthalate; polyacrylontrile-based fibers; or fibers of inorganic origin such as asbestos, glass, etc. The invention may be applied to textile materials which are in the form of bulk fibers, filaments, yarns, threads, slivers, roving, top, webbing, cord, tape, woven or knitted fabrics, felts, or other non-woven fabrics, garments or garment parts.

EXAMPLES

The invention is further demonstrated by the following examples which are provided by way of illustration, not limitation.
Test Methods The tests referred to in the examples were carried out as described below:

Oil Repellency: The test used was the AATCC Test Method 118–1966T. Ratings are from 0 to 8 with the higher values signifying the greater resistance to oil penetration. In particular, the oil-repellency rating is the highest-numbered test liquid which will no wet the fabric in within a period of 30 seconds. The liquids and their corresponding numbers are:

| No. | Composition |
|---|---|
| 1 | "Nujol" |
| 2 | 65:35 "Nujol" and n-hexadecane, by vol. |
| 3 | n-hexadecane |
| 4 | n-tetradecane |
| 5 | n-dodecane |
| 6 | n-decane |
| 7 | n-octane |
| 8 | n-heptane |

EXAMPLE 1 — PREPARATION OF HEPTAFLUOROISOPROPYL

ALLYL ETHER (HAE)

$(CF_3)_2CF-O-CH_2-CH=CH_2$

A dry, 3-liter flask fitted with a stirring paddle, gas inlet tube, and a Dry Ice condenser was charged with 143.3 g. (2.5 mole) of anhydrous KF followed by 800 ml. of dry N,N-dimethylformamide. The mixture was stirred, and 410 g. (2.5 mole) of hexafluoroacetone was added at such a rate that the gas condensate dripped slowly from the Dry Ice condenser. A clear solution of the hexafluoroacetone-KF adduct resulted after the addition. Allyl bromide (280 g., 2.3 moles) was then added in one shot. The Dry Ice condenser was replaced with a water-cooled condenser, and the solution was stirred and heated at 75° C. for 12 hours. The product was then removed from the DMF solution under vacuum and collected in a Dry Ice trap. Distillation on a short Vigreux column provided 453 g. (87 percent yield) of product; b.p. 63°–64° C. at 760 mm.

EXAMPLE 2 — PREPARATION OF HEPTAFLUOROISOPROPYL

METHALLYL ETHER (HME)

$(CF_3)_2CF-O-CH_2-C(CH_3)=CH_2$

This compound was prepared in a manner analogous to that used for the allyl ether (example 1), using hexafluoroacetone, anhydrous KF, dimethylformamide, and methallyl chloride. Heptafluoroisopropyl methallyl ether was obtained in 85 percent yield, b.p. 82° C/760 mm., $n_D^{25}$ 1.3129.

EXAMPLE 3 — PREPARATION OF 1-H,1-H-PENTADECA

FLUOROOCTYL METHALLYL ETHER (PME)

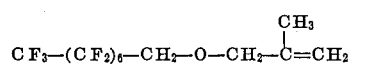

$$CF_3-(CF_2)_6-CH_2-O-CH_2-\underset{\underset{CH_3}{|}}{C}=CH_2$$

A dry, 500-ml., round bottom flask was charged with 62.5 g. of 1-H,1-H-pentadecafluorooctanol, 21 g. of methallyl chloride, 43 g. of potassium carbonate, and 75 ml. of acetone. The mixture was refluxed for 5 days. Then the liquid was filtered to remove the salt precipitate and the filtrate poured into water. The heavier (fluorocarbon) layer was separated, washed twice with water, dried, and distilled. The product was collected in a yield of 21 grams, b.p. 189°–190° C.

EXAMPLE 4 — PREPARATION OF 1-H,1-H-PENTADECAFLUORO-

OCTYL ALLYL ETHER (PAE)

$CF_3-(CF_2)_6-CH_2-O-CH_2-CH=CH_2$

This compound was prepared in a manner analogous to that used for PME (Example 3), using 125 g. of 1-

H,1-H-pentadecafluorooctanol, 56 g. of allyl bromide, 86 g. of $K_2CO_3$ and 150 ml. of acetone. Distillation yielded 69 g. of pure product, b.p. 178° C/760 mm.

EXAMPLE 5 — PREPARATION OF HME/MA AND HAE/MA COPOLYMERS

A series of copolymers of heptafluoroisopropyl methallyl ether (HME) and maleic anhydride (MA), and copolymers of heptafluoroisopropyl allyl ether (HAE) and maleic anhydride (MA) were prepared using the following typical procedure.

HME, 2.4 g. (0.01 mole) and MA, 0.98 g. (0.01 mole) were placed in a thick-walled glass tube, with 5 ml. of benzene containing 0.0242 g. ($1 \times 10^{-4}$ mole) of benzoyl peroxide. The tube was sealed with a rubber cap and the mixture was frozen in Dry Ice-acetone. The tube was evacuated, thawed, filled with nitrogen, the re-frozen, etc.—the entire sequence being repeated three times. Finally, the tube was sealed under nitrogen at atmospheric pressure and then heated overnight in a steam bath. The product was removed from the tube and heated for 4–6 hours in a vacuum oven at 80° C. to remove solvent and and unreacted monomers. The yield of copolymer was 2.9 g. (86 percent conversion). The molecular weight (determined on a membrane osmometer) was 81,500. Analysis — Calculated for $(C_{11}H_9FO)$; C, 39.05; H, 2.7; Found, C, 39.27; H, 2.89. The copolymer was soluble in acetone, dimethylformamide, and tetrahydrofuran; slightly soluble in benzotrifluoride; insoluble in benzene and "Freon 113."

A series of copolymers were prepared using the procedure described above, with changes in the nature of the catalyst and the proportion thereof. Also, in some of the runs, the heptafluoroisopropyl methallyl (HME) replaced by the corresponding allyl ether (HAE). The conditions employed and the results obtained are tabulated below.

TABLE I

| Fluorinated monomer* | Catalyst | Proportion of catalyst, mole % | Conversion % | molecular weight | intrinsic viscosity*** |
|---|---|---|---|---|---|
| HME | lauroyl peroxide | 0.1 | 55 | n.d.** | 0.45 |
| do. | do. | 0.5 | 80 | n.d. | 0.29 |
| HME | benzoyl peroxide | 0.1 | 58 | 630,000 | 0.3 |
| do. | do. | 0.5 | 86 | 81,500 | 0.16 |
| do. | do. | 1.0 | 100 | 56,200 | 0.15 |
| HAE | benzoyl peroxide | 1.0 | 32 | 11,200 | 0.11 |
| do. | do. | 5.0 | 83 | 5,600 | 0.03 |

\* In each case, a 1/1 mole ratio of fluorinated monomer to maleic anhydride was used.
\*\* n.d. signifies not determined.
\*\*\* Intrinsic viscosity determined in acetone solution at 25° C.

EXAMPLE 6 — PREPARATION OF COPOLYMER PME/MA

PME (prepared as described in Example 3) was copolymerized with maleic anhydride, using the following technique. Five-thousandths of a mole each of PME and MA, 2 ml. of benzene, and 30 mg. of lauroyl peroxide were placed in a tube which was evacuated and sealed under nitrogen as previously described. The sealed tube was heated on a steam bath for 3 hours. The contents of the tube was removed and volatiles were vaporized under vacuum at about 80° C. The copolymer was obtained as a clear solid in a conversion of 95 percent. It was soluble in acetone and several other polar solvents.

EXAMPLE 7
Preparation of Terpolymer PME/HME/MA

| | |
|---|---|
| PME | 0.005 mole |
| HME | 0.005 mole |
| MA | 0.01 mole |
| Benzoyl peroxide | 60 mg. |
| Benzene | 3 ml. |

The above ingredients were placed in a tube which was evacuated and sealed under vacuum. After heating for 3 hours on a steam bath, the contents of the tube was removed and heated under vacuum at 80° C. to remove volatiles. A clear hard copolymer was obtained in 90 percent conversion.

EXAMPLE 8 — PREPARATION OF COPOLYMER PAE/MA

PAE (prepared as described in Example 4) and maleic anhydride were copolymerized as in Example 6, using equimolar quantities of PAE and MA and a 5 mole % of benzoyl peroxide as the catalyst.

EXAMPLE 9 — APPLICATION OF THE COPOLYMERS AND TERPOLYMERS TO TEXTILES

Solutions were made containing 1 and 2 percent of the copolymers and terpolymers previously described, using acetone as the solvent. These solutions were applied to fabrics, using the following technique.

A swatch of the fabric was wet out with the solution, squeezed in a roller to remove excess liquid, air-dried, and cured in an oven at 100° C. for 10 minutes.

The treated fabrics and samples of the untreated fabric were then tested for oil repellency initially and after application of a standard laundering technique with a detergent-water formulation in a household-type washing machine.

Two different fabrics were used in the tests—a 100 percent wool fabric and a 50/50 wool and cotton blend fabric.

The materials used and the results obtained are tabulated below:

TABLE II
Treatment of Wool Fabric, Using 1% Polymer Solution

| Polymer used | Oil repellency | |
|---|---|---|
| | Initial | After washing |
| HAE/MA | 3 | 2 |
| HME/MA | 2 | 2 |
| PAE/MA | 6 | 5 |
| PME/MA | 6 | 5 |
| HME/PME/MA | 5 | 4 |
| None used (control) | 0 | 0 |

TABLE III
Treatment of Wool Fabric, Using 2% Polymer Solution

| Polymer used | Oil repellency | |
|---|---|---|
| | Initial | After washing |
| HAE/MA | 4 | 3 |
| HME/MA | 3 | 3 |
| PAE/MA | 6 | 6 |
| PME/MA | 6 | 5 |
| HME/PME/MA | 5 | 5 |
| None used (control) | 0 | 0 |

TABLE IV

Treatment of Wool/Cotton Fabric, Using 1% Polymer Solution

| Polymer used | Oil repellency Initial | After washing |
|---|---|---|
| HAE/MA | 2 | 2 |
| HME/MA | 2 | 1 |
| PAE/MA | 6 | 5 |
| PME/MA | 6 | 5 |
| HME/PME/MA | 5 | 4 |
| None used (control) | 0 | 0 |

TABLE V

Treatment of Wool/Cotton Fabric, Using 2% Polymer Solution

| Polymer used | Oil repellency Initial | After washing |
|---|---|---|
| HAE/MA | 3 | 3 |
| HME/MA | 2 | 2 |
| PAE/MA | 6 | 6 |
| PME/MA | 6 | 5 |
| HME/PME/MA | 5 | 4 |
| None used (control) | 0 | 0 |

MODIFIED COPOLYMERS

Another phase of the invention concerns the provision of modified copolymers, for example, those wherein the anhydride units have been converted into carboxyl, carboxylate, ester, or amide groups. These modified copolymers may be readily prepared by subjecting the copolymers as previously described to hydrolysis, esterification, or amidation. Typical methods for such operations are shown in Examples 10, 11, and 12. By suitable choice of the reactants applied to the copolymers one can produce modified copolymers wherein the hydrophilic units are any of the following illustrative examples:

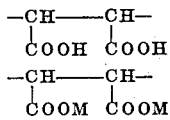

wherein M is an alkali metal or aluminum.

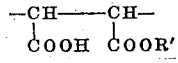

wherein R' is a hydrocarbon radical such as methyl, ethyl, butyl, hexyl, cyclohexyl, octyl, dodecyl, benzyl, phenyl, or the like, or an alkoxyalkyl radical such as — (O—CH$_2$—CH$_2$)$_n$—O—R' wherein n is an integer from 1 to 12.

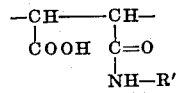

wherein R' is as defined above.

In general, the modified copolymers of the invention are those which contain recurring units of the structure

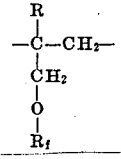

wherein R and R$_f$ are as described above, plus recurring units of the structure

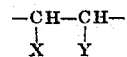

wherein X and Y are each a member of the group consisting of carboxyl, carboxylate, ester, and amide radicals.

The modified copolymers are useful for the same purposes as the unmodified copolymers, for example, to provide fibrous materials with both soil-repellent and soil-release qualities. The modified copolymers are applied to fibrous materials in the same manner as previously described.

EXAMPLE 10

A sample of an HME/MA copolymer (intrinsic viscosity 0.15) was dissolved in a small quantity of acetone and hydrolyzed to the phenolphthalein endpoint by adding 0.5 N NaOH. This produced a copolymer containing repeating units of the structures

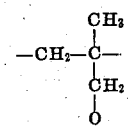

and

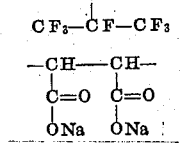

A tri-blend fabric of wool/cotton/polyester was given a durable press treatment as follows: A 20 percent aqueous solution of dimethylol dihydroxyethylene urea (DMDEU), containing approximately 0.5% Zn (NO$_3$)$_2$ catalyst was prepared. Fabric swatches were immersed in this solution, and squeezed to a wet pick-up of 40–50 percent. The treated swatches were then air-dried, pressed for one minute in a high-heat (350° F.) press, and cured in an oven at 325° F. for 15 minutes. Following this treatment, the swatches were wet-out in a 2 percent aqueous solution of the polymeric sodium salt described above. After removal of excess liquid in a squeeze roll, the fabrics were dried in air, and cured at 100° C. for 10 minutes.

Samples of the treated and untreated fabrics were evaluated for soil release properties, using AATCC test 130–1969. In this test, "Nujol" mineral oil is applied to the fabric, then the fabric is subjected to washing with an aqueous detergent formulation. The residual stain on the fabric is then rated on a scale of 5 to 1 by comparison with a standard stain-release replica which displays a graduated series of stains. The highest number, 5, indicates complete stain removal while the lowest, 1, indicates virtually no stain removal.

It was found that the fabric which had been treated with the polymeric sodium salt gave a soil-release rating of 5 while a sample of the fabric which had been given only the durable press treatment had a rating of 2.

EXAMPLE 11

A sample of HME/MA copolymer (intrinsic viscosity 0.15) was dissolved in acetonitrile. An excess of methoxy triethylene glycol

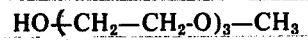

was added and the solution was refluxed overnight. Then, solvent and excess methoxy triethylene glycol were removed under vacuum, leaving a residue of a solid modified copolymer which contained repeating units of the structures

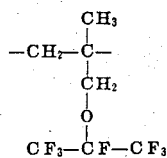

and

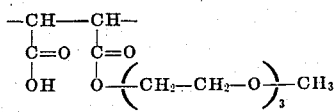

Films of this copolymer showed the dual properties of being oil-repellent but hydrophilic. Drops of n-hexadecane placed on the film surface remained stable with a contact angle of ca. 56°, while water drops placed on the film surface gradually spread over the surface.

EXAMPLE 12

A sample of an HME/MA copolymer (intrinsic viscosity 0.15) was dissolved in acetonitrile. An excess of n-butyl amine was added, and the reaction mixture refluxed overnight. Then, solvent and excess amine were removed under vacuum, leaving a residue of a clear, slightly-yellow solid modified copolymer which contained recurring units of the structures

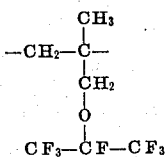

and

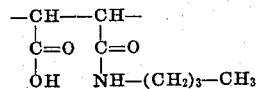

Infrared analysis indicated that the structure shown above had been obtained.

EXAMPLE 13

A sample of a copolymer of maleic anhydride and heptafluoroisopropyl allyl ether (molecular weight 5,600, intrinsic viscosity 0.03), was dissolved in dimethyl-formamide to make a 5 percent solution. A sample of wool flannel weighing approximately 1 gram was immersed in 10 ml. of this solution and heated at 110° C. for 90 minutes. The treated wool sample was removed from the solution and washed three times with acetone, in which the copolymer is very soluble. After drying, the weight increase of the fabric was 3 percent, indicating that the copolymer has been grafted to the wool.

Having thus described our invention, we claim:

1. A process for modifying a fibrous substrate, which comprises
   I. depositing on the fibrous substrate a copolymer which contains
      a. recurring units of the structure

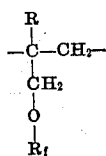

wherein R is a member of the group consisting of H and $CH_3$, and $R_f$ is a fluoroalkyl radical which contains a terminal perfluoroalkyl group having 3 to 18 perfluorinated carbon atoms, and
      b. recurring units of the structure

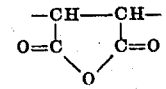

the aforesaid units a and b being in a 1:1 mole ratio,
   II. the said copolymer being deposited as a dispersion in a volatile liquid carrier; and
   III. curing the so-treated fibrous substrate by heating it at a temperature about from 50° to 150° C.

2. The process of claim 1 wherein R is H.
3. The process of claim 1 wherein R is $CH_3$.
4. The process of claim 1 wherein $R_f$ is

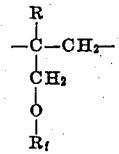

5. The process of claim 1 wherein $R_f$ is $$CF_3-(CF_2)_6-CH_2-$$

6. A process for modifying a fibrous substrate, which comprises
   I. depositing on the fibrous substrate a copolymer which contains
      a. recurring units of the structure

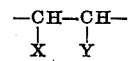

wherein R is a member of the group consisting of H and $CH_3$, and $R_f$ is a fluoroalkyl radical which contains a terminal perfluoroalkyl group having three to 18 carbon atoms, and
      b. recurring units of the structure $$-CH-CH- \atop X \quad Y$$

wherein X and Y are each a member of the group consisting of carboxyl, carboxylate, ester, and amide radicals,
      the aforesaid units a and b being in a 1:1 mole ratio,
   II. the said copolymer being deposited as a dispersion in a volatile liquid carrier; and
   III. curing the so-treated fibrous substrate by heating it at a temperature about from 50° to 150° C.

7. The process of claim 6 wherein X and Y are each —COOH.
8. The process of claim 6 wherein X and Y are each —COONa.
9. The process of claim 6 wherein X is —COOH and Y is $$-\overset{O}{\overset{\|}{C}}-O-(CH_2-CH_2-O)_3-CH_3$$

10. The process of claim 6 wherein X is —COOH and Y is

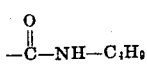

11. As an article of manufacture, fibrous material carrying a deposit of an addition copolymer which contains a. recurring units of the structure

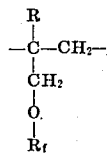

wherein R is a member of the group consisting of H and $CH_3$, and $R_f$ is a fluoroalkyl radical which contains a terminal perfluoroalkyl group having three to 18 perfluorinated carbon atoms, and b. recurring units of the structure

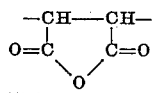

the aforesaid units a and b being in a 1:1 mole ratio.

12. The article of claim 11 wherein R is H.
13. The article of claim 11 wherein R is $CH_3$.
14. The article of claim 11 wherein $R_f$ is

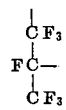

15. The article of claim 11 wherein $R_f$ is $$CF_3-(CF_2)_6-CH_2-$$

16. As an article of manufacture, fibrous material carrying a deposit of an addition copolymer which contains a. recurring units of the structure

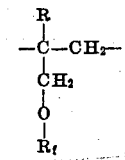

wherein R is a member of the group consisting of H and $CH_3$, and $R_f$ is a fluoroalkyl radical which contains a terminal perfluoroalkyl group having three to 18 carbon atoms, and b. recurring units of the structure

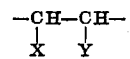

wherein X and Y are each a member of the group consisting of carboxyl, carboxylate, ester, and amide radicals, the aforesaid units a and b being in a 1:1 mole ratio.

17. The article of claim 16 wherein X and Y are each —COOH.
18. The article of claim 16 wherein X and Y are each —COONa.
19. The article of claim 16 wherein X is —COOH and Y is

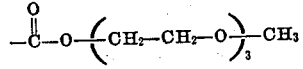

20. The article of claim 16 wherein X is —COOH and Y is

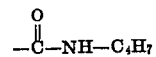

* * * * *